United States Patent [19]

Spector et al.

[11] Patent Number: 4,556,491

[45] Date of Patent: Dec. 3, 1985

[54] AVOIDANCE OF RISING SLUDGE IN BIOLOGICAL WASTEWATER TREATMENT CLARIFIERS

[75] Inventors: Marshall L. Spector, Allentown; Sun-nan Hong; Robert P. Seebohm, both of Emmaus, all of Pa.

[73] Assignee: Air Products and Chemicals, Inc., Allentown, Pa.

[21] Appl. No.: 677,715

[22] Filed: Dec. 3, 1984

Related U.S. Application Data

[63] Continuation of Ser. No. 537,470, Sep. 29, 1983, abandoned.

[51] Int. Cl.⁴ .................................................. C02F 3/12
[52] U.S. Cl. ..................................... 210/608; 210/614; 210/626; 210/709; 210/718; 210/744; 210/903
[58] Field of Search ............... 210/608, 614, 626–628, 210/709, 718, 744, 750, 96.1, 188, 123, 124, 129, 903

[56] References Cited

U.S. PATENT DOCUMENTS

| | | | |
|---|---|---|---|
| 1,202,474 | 10/1916 | Bolton | 210/718 |
| 2,065,123 | 12/1936 | Downes | 210/626 |
| 2,780,360 | 2/1957 | Bon | 210/718 |
| 3,617,579 | 11/1971 | Gunderloy | 210/718 |
| 3,623,976 | 11/1971 | Cessna | 210/626 |
| 3,730,883 | 5/1973 | Lefrancois | 210/614 |
| 3,824,185 | 7/1974 | Caldwell | 210/903 |
| 3,892,659 | 7/1975 | Kirk | 210/744 |
| 4,056,465 | 11/1977 | Spector | 210/7 |
| 4,183,810 | 1/1980 | Boenens | 210/903 |
| 4,216,089 | 8/1980 | Boon | 210/718 |
| 4,315,823 | 2/1982 | Witt | 210/626 |

FOREIGN PATENT DOCUMENTS

| | | | |
|---|---|---|---|
| 47-4037 | 2/1972 | Japan | 210/903 |
| 827414 | 5/1981 | U.S.S.R. | 210/718 |

OTHER PUBLICATIONS

Power Special Report, Waste-Water Treatment, R. H. Marks, Jun. 1967.

*Primary Examiner*—Ernest G. Therkorn
*Attorney, Agent, or Firm*—Mark L. Rodgers; E. Eugene Innis; James C. Simmons

[57] ABSTRACT

The problem of rising sludge in biological wastewater treatment secondary clarifiers is overcome by minimizing entrainment of nitrogen gas with mixed liquor entering the transfer pipe to the clarifier such that the level of dissolved nitrogen in the biomass settling in the clarifier remains less than that in equilibrium with nitrogen gas at the pressure prevailing in the biomass. This invention is most efficacious in cases where soluble oxides of nitrogen are present and are reduced by the biomass to elemental nitrogen. In accordance with one described embodiment the excess nitrogen is removed by degassing of the mixed liquor in the effluent pit of the system by deepening and widening the usual pit in such manner that the rate of descent of mixed liquor therein to a discharge outlet is less than 0.4 feet per second and the depth is greater than 4 feet, thus permitting the gas-containing macrobubbles to rise to the surface of the pit where these are degassed. The mixed liquor thus freed of macrobubbles is then passed through a hydraulic pressure zone enroute to the clarifier in which pressure zone the nuclei microbubbles are caused to dissolve.

16 Claims, 4 Drawing Figures

AVOIDANCE OF RISING SLUDGE IN BIOLOGICAL WASTEWATER TREATMENT CLARIFIERS

This is a continuation of application Ser. No. 537,470, filed Sept. 29, 1983, now abandoned.

BACKGROUND OF THE INVENTION

This invention relates generally to treatment of wastewater in systems employing recycled activated sludge.

The activated sludge process has been used for many years for the removal of biological oxygen demand (BOD) from wastewater. This process involves, in general, mixing the wastewater with recycled sludge containing microorganisms (biomass) and exposing the mixed liquor to aeration under conditions such that the biological oxygen demand of the wastewater is metabolized. Following such treatment, the mixed liquor is introduced into a settling tank, termed a secondary clarifier, in which the biomass settles out and concentrates while the clear liquor is discharged overhead for return to receiving streams or reservoirs, with or without further treatment. A major portion of the biomass which is concentrated and settled at the bottom of the clarifier, is recycled to the treating system for admixture with wastewater influent and a minor portion purged to maintain a constant biosolids inventory within the system.

The activated sludge process has been extensively described in the literature and several of its modifications are summarized in a special report on Wastewater Treatment by R. H. Marks in the June 1967 issue of POWER.

Among the problems encountered in operation of the activated sludge process was the difficulty, at times, in effecting desired separation of the biomass from the treated wastewater in the secondary clarifier. One of the reasons for the poor settling properties of the treated wastewater was found to be the proliferation of high surface area or filamentous species of microorganisms resulting in a phenomenon known as "bulking". Various modifications of the basic activated sludge process were proposed to overcome the bulking problem as described by Spector in the introductory paragraphs of U.S. Pat. No. 4,056,465.

As stated in U.S. Pat. No. 4,056,465, while certain of the methods theretofore proposed were effective in avoiding bulking biomass, they were not capable of doing so under conditions which also were effective in removal of nitrogen and/or phosphorus nutrient values from the wastewater influent. The method disclosed in this patent favors the selective production of nonbulking biomass while also obtaining effective removal of phosphates. By the proposed method of the patent, the wastewater and recycled sludge are initially admixed under anaerobic conditions in the substantial absence of oxygen or oxidizing agents and subsequently subjected to aeration followed by clarification. By a further alternative modification disclosed in the patent, nitrates and/or nitrites (NOX) are also removed by interposing an "anoxic" zone between the anaerobic zone and the aeration zone.

Thus, while the problems associated with bulking sludge have been largely overcome, there remains another major problem in sludge separation from biologically treated wastewater. This problem is the observed phenomenon of "rising sludge"; that is the ascent to the surface or upper regions of the secondary clarifier of sludge which had originally settled to the bottom of the clarifier. This phenomenon is different from the problem of filamentous sludge which does not settle adequately in the clarifier.

Rising sludge can occur in any activated sludge system but is particularly evident when the effluent from the aeration zone entering the clarifier, contains NOX, which is subsequently reduced to elemental nitrogen gas by the oxygen demand of the sludge at the bottom of the clarifier. When the concentration of dissolved nitrogen is in excess of that in equilibrium with nitrogen at the pressure existing in the sludge in the clarifier, excess nitrogen degasses; this results in formation of bubbles within the biomass and some or all of the settling biomass floats with the aid of gas bubbles to the top of the clarifier where it is discharged from the system with the effluent wastewater. This discharge of biomass results in excessive solids concentration in the treated water and diminished ability to maintain an inventory of biological solids within the system. No methods have heretofore been developed which effectively address this problem.

There are a variety of designs for clarifiers and for the introduction of mixed liquor to these clarifiers. In a typical system the mixed liquor from the aeration zone is discharged into an open channel or trough through which it flows and discharges into a receiving basin or so-called "effluent pit". The mixed liquor is withdrawn from the bottom of the pit through an effluent pipe, flowing downwardly for some distance through the pipe then laterally to an upwardly directed leg extending from the end of the lateral leg of the pipe through the bottom of the clarifier to a discharge level near the top of the clarifier. By the described arrangement, the height of the liquid in the clarifier is substantially the same as that in the effluent pit. This conventional arrangement is illustrated in FIG. 1 of the accompanying drawings. Certain of these systems also provide means to aerate the mixed liquor, via air sparging, during passage from the aeration zone to the effluent pit and in the effluent pit itself.

In an investigative study undertaken to determine the cause for the rising of bubbles in the clarifier, which led to the present invention, it was determined that these bubbles were formed at least in part as a result of dissolution of nitrogen from the air entrained in the mixed liquor and a concomitant rise in dissolved nitrogen above that in equilibrium with ambient air during its transport from the aeration basin to the clarifier.

SUMMARY OF THE INVENTION

In accordance with the present invention the major cause of rising bubbles in the clarifier is minimized or eliminated. It was found that these bubbles at least in part resulted from the dissolution of nitrogen from the air entrained in the mixed liquor during transport from the aeration basin to the clarifier. These entrained air bubbles, from which the oxygen is depleted by satisfaction of biological oxygen demand, are compressed as the mixed liquor descends through the hydraulic pressure zone defined as the column of liquid extending from surface level of the liquid in the effluent pit to the bottom of the descending effluent pipe.

In accordance with the present invention hydraulic compression is utilized effectively to dissolve the microbubbles (i.e., those of less than about 0.02 inches in diameter) while the entrainment of larger gas bubbles, termed macrobubbles, is avoided by designing the dimensions of the effluent pit such that the downward flow rate of mixed liquor in the pit is exceeded by the upward rate of rise of macrobubbles, thus eliminating such macrobubbles from the system.

BRIEF DESCRIPTION OF THE DRAWINGS

In the accompanying drawings.

DETAILED DESCRIPTION

Figure 1:
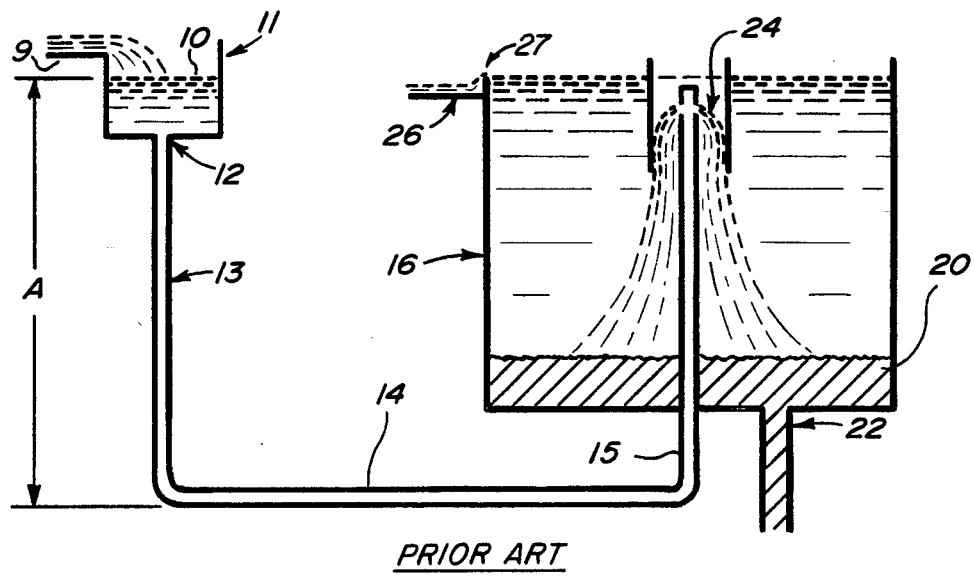
FIG. 1 is a simplified schematic flow diagram of a typical prior art system for the transfer of treated mixed liquor from the aeration basin (not shown) to the secondary clarifier.

FIG. 1 illustrates a typical prior art system for transfer of mixed liquor from the aeration basin (not shown) to the secondary clarifier. The liquor leaves the aeration basin through a trough or channel 9 which discharges the mixed liquor 10 into the effluent pit 11. Mixed liquor is withdrawn from the pit through a discharge opening 12 at the bottom thereof into descending transfer pipe 13. The liquor is transferred from pit 11 into clarifier 16 through the vertical downflow leg of pipe 13, passing via the lateral extension 14 of the pipe into the ascending leg 15 which passes upwardly through the bottom of clarifier 16 to a discharge level near the top of the clarifier. A concentric open cylindrical pipe surrounds the upper portion of leg 15 to provide a stilling well 24 for the discharging liquor. The denser sludge settles to the bottom of clarifier 16 forming a sludge layer 20 which is withdrawn through a conduit 22 at or near the bottom of the clarifier, a portion of which sludge is recycled to the treating system for admixture with the wastewater influent. The clarified overhead liquor overflows to discharge 26 at the weir 27.

The level of the mixed liquor 10 in pit 11 is determined by the level of overflow weir 27 and the flow resistance in transfer pipe 13. The vertical distance from the surface of the mixed liquor in pit 11 to the lowest point of pipe 13 defines the magnitude of the hydraulic head of compression designated by the letter A in the drawings.

The mixed liquor of a conventional transfer system, such as is illustrated in FIG. 1, which enters the effluent pit 11 contains gas which becomes entrained in the liquor by turbulent air-water mixing as the liquor falls from the bottom of channel 9 to the level of the liquid surface in pit 11. The liquid in effluent pit 11 is typically less than 4 feet deep and/or the bulk liquor descent rate is high, say at a velocity in excess of 0.4 feet per second. At this high velocity, it was observed that, relative to the volume of mixed liquor, more than 1% by volume of the gas enters the mouth of transfer pipe 13, in which pipe the descending linear velocity of the liquid is sufficiently high to prevent separation of entrained gas from the mixed liquor. In some plants, moreover, air is sparged into the effluent channel 9 and/or into the effluent pit 11, which results in an even greater volume of entrained gas contained in the liquor entering pipe 13. Since the biological oxygen demand of the mixed liquor depletes the oxygen content of the dissolved air, the entrained gas is composed largely of nitrogen, which is dissolved in the liquor to the extent of about 18 parts per million (ppm) by weight at 25° C. at a nitrogen pressure of one atmosphere. The mixed liquor is typically compressed an additional half atmosphere during passage through a compression zone (A) of about 17 feet of water or to about 7.4 psig during passage to the secondary clarifier. As a result of such compression, the dissolved nitrogen concentration is increased from about 18 ppm by weight at a nitrogen pressure of one atmosphere to about 27 ppm at a nitrogen pressure of about one and a half atmospheres. The volume of gaseous nitrogen required to increase the dissolved nitrogen concentration in the mixed liquor from 18 to 27 ppm is about 7 cubic centimeters per liter of mixed liquor, which amount is present when the entrained nitrogen in the mixed liquor is equal to or greater than about 0.7 volume percent. In a particular plant where the problem of rising sludge was observed, samples of the mixed liquor from the descending liquor zone of the effluent pit were at time found to have an entrained gas volume in excess of 20%.

Where the dissolved nitrogen content of the mixed liquor is greater than that in equilibrum with nitrogen at a given clarifier depth, the liquor is supersaturated and nitrogen can degas to form nitrogen bubbles. The requisite concentration of dissolved nitrogen necessary to produce a gas bubble at a given clarifier depth is shown in Table 1 below.

TABLE 1

EQUILIBRIUM DISSOLVED NITROGEN IN CLARIFIER AS A FUNCTION OF CLARIFIER DEPTH AT 25° C.

| Clarifier Depth Feet of Water | ppm (wt) Dissolved Nitrogen Needed to Produce a Gas Bubble |
|---|---|
| 0 (Surface) | >14.4 equilibrium with 80% $N_2$ in air |
| 5 | >20.6 equilibrium with 100% $N_2$ |
| 10 | >23.2 equilibrium with 100% $N_2$ |
| 15 | >25.9 equilibrium with 100% $N_2$ |
| 20 | >28.5 equilibrium with 100% $N_2$ |
| 25 | >31.2 equilibrium with 100% $N_2$ |
| 30 | >33.8 equilibrium with 100% $N_2$ |

Table 2, below, shows the tolerance for nitrogen release at 25° C. in the secondary clarifier receiving mixed liquor saturated with atmospheric nitrogen in order to avoid nitrogen bubble formation. In column a of the table, there is shown the amount of nitrogen (ppm) present at different depths in a 14-foot standard clarifier in mixed liquor containing no entrained air at the point of entry to pipe 13. Column b shows the corresponding maximum concentration of nitrogen at the same depths in the case of saturation with 100% nitrogen gas, such that no outgassing of nitrogen will occur. Column c shows the maximum increase in dissolved nitrogen that can be tolerated before bubble formation can take place (column b minus column a). As seen from the table, 3.4 to 10.8 parts per million of nitrogen production may be tolerated in a 14-foot deep clarifier. In the event that the aeration compression effect is exerted to the maximum, there would be a tolerance of only about 3 ppm rather than the theoretical 10.8 ppm shown in column c of the table. In reality, the upper portion of the system of column b will be in equilibrium with air, and the real tolerance will be less than that indicated in column c.

TABLE 2

| a<br>In equilibrium with air (80% $N_2$) at surface (ppm $N_2$) | Depth (Feet) | b<br>In equilibrium with 100% $N_2$ at depth (ppm $N_2$) | c<br>Differential b minus a (ppm $N_2$) |
|---|---|---|---|
| 14.5 | 0 | 17.9 | 3.4 |
| 14.5 | 4 | 20.1 | 5.6 |
| 14.5 | 8 | 22.2 | 7.7 |
| 14.5 | 11 | 24.3 | 9.8 |
| 14.5 | 14 | 25.3 | 10.8 |

When the liquor depth of the conventional clarifier 16 is 10 feet and 27 ppm nitrogen are dissolved in the bulk liquor, there will be a tendency for gaseous nitrogen bubbles to form since 27 ppm of dissolved nitrogen are greater than the 23.2 parts per million needed to produce a gas bubble at a depth of ten feet (see Table 1). In addition, in those cases where NOX is present, additional nitrogen is produced, which serves to form more and/or larger bubbles. This increases the flotation potential and aggravates the rising sludge problem.

Figure 4:
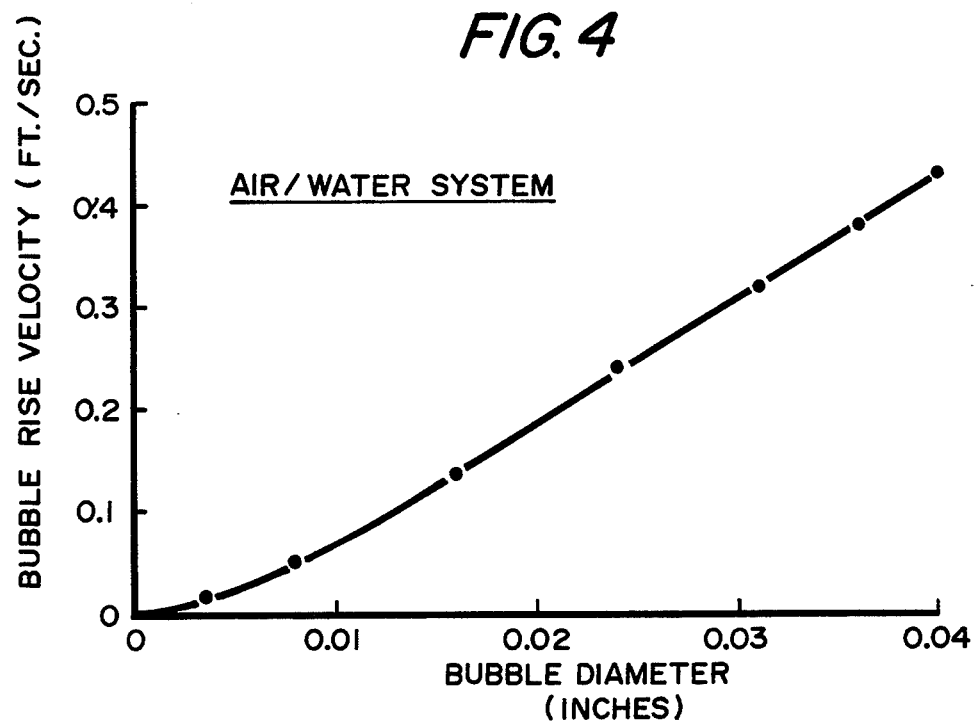
FIG. 4 is a graph showing bubble rise velocity as a function of bubble diameter.

It will be seen by reference to the graph in FIG. 4 that the velocity at which bubbles rise in an air-water system is dependent upon the size of the bubbles. Microbubbles, defined as those having a diameter of up to about 0.02 inches, will rise at a rate of less than about 0.2 feet per second. As the bubble diameter is increased to 0.04 inches, the bubble rise velocity exceeds 0.4 feet per second.

It has been found that the passage of mixed liquor containing entrained small bubbles through the hydraulic compression zone enroute to the clarifier results in dissolution of nitrogen from the entrained bubbles since these small bubbles cannot rise through the zone at sufficient velocity to surpass the descent rate of the mixed liquor. Thus, the entrained excess nitrogen can degas within the clarifier forming larger bubbles giving rise to the sludge flotation problem.

It was unexpectedly found, however, that the passage of mixed liquor through a hydraulic compression zone in the absence of excessive entrainment of gas is beneficial. Without being bound to any particular explanation, it is believed that the compression dissolves the microbubbles which serve as nuclei to promote the rate of desupersaturation of dissolved nitrogen. This factor is taken advantage of in accordance with the present invention wherein hydraulic compression is utilized in order to dissolve the microbubbles, such as those of less than 0.02 inches in diameter, while the entrainment of larger gas bubbles is avoided, as is explained below. The present invention solves the rising sludge problem by minimizing or eliminating macrobubbles from the mixed liquor discharged into the clarifier and by utilizing the hydraulic pressure in zone A to effect the dissolution of the microbubbles.

In accordance with a preferred embodiment of the invention, the mixed liquor effluent pit is designed of such width and depth that the downward flow rate of the mixed liquor in the pit is exceeded by the upward rate of rise of the macrobubbles, thereby eliminating macrobubbles from the system while microbubbles are dissolved as a result of the hydraulic pressure imposed in the downcomer conduit from the pit.

Figure 2:
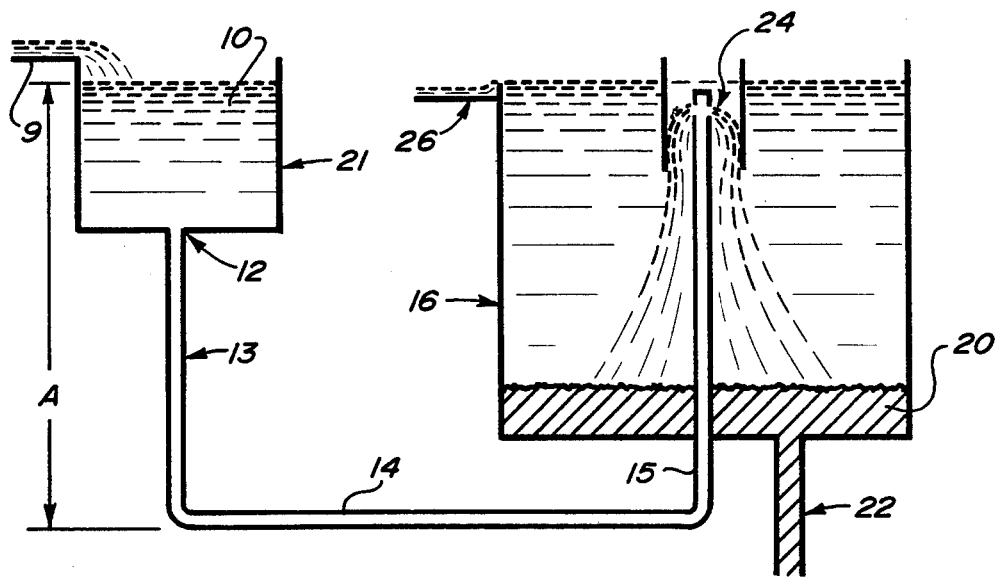
FIG. 2 is a simplified schematic flow diagram of an improved system in accordance with a preferred embodiment of the invention.

A practical application of the principle of the invention is illustrated in FIG. 2 wherein like parts are numbered as in FIG. 1.

As seen in FIG. 2, effluent pit 21, receiving the mixed liquor from channel 9 is made wider and deeper than the conventional effluent pit shown in FIG. 1. The depth of the descending liquor in pit 21 is greater than four feet and the downward velocity of the descending liquor therein above the entrance to the transfer pipe 13 is maintained at less than 0.4 feet per second, preferably less than 0.2 feet per second, by enlarging the horizontal area of the pit. This combination serves to reduce the amount of entrained gas in the mixed liquor at the point of entry 12 to the effluent pipe to less than about 0.4 volume percent, as opposed to that prevailing in conventional design wherein more than one volume percent of gas is entrained in the liquor entering the mouth of the transfer pipe.

In the embodiment illustrated in FIG. 2, the depth of the descending liquor in effluent pit 21 is increased to about 10 feet or more, which allows time for small bubbles to coalesce and for macrobubbles to escape prior to their entering the inlet 12 of pipe 13, in which pipe the linear velocity of the descending liquor accelerates to greater than a foot per second and there is no further opportunity for the bubbles to escape.

A critical parameter in the design of the effluent pit is to assure that the horizontal area is adequate to obtain a velocity therein of the descending liquor of less than 0.4 feet per second. This descending velocity, as shown in FIG. 4, is less than the rise velocity of the macrobubbles. Calculation of the area of the effluent pit to achieve a given liquor descent velocity is a function of the flow rate of mixed liquor discharging into the pit. Table 3 below shows the descent rate of liquor in the pit as a function of its horizontal area, based on a given mixed liquor flow of 10 million gallons per day. The values shown in the table can be used to calculate horizontal areas of effluent pits for other flow rates. For instance, when the mixed liquor flow rate is halved to 5 million gallons per day, all of the reported descent rate values of Table 3 are halved.

TABLE 3

DESCENT RATE OF MIXED LIQUOR AT A FLOW OF 10 MILLION GALLONS PER DAY AS A FUNCTION OF THE HORIZONTAL AREA OF THE EFFLUENT PIT

| Horizontal Area of Effluent Pit, Square Feet | Descent Rate, Feet Per Second |
|---|---|
| 5 | 3.1 |
| 10 | 1.5 |
| 15 | 1.0 |
| 20 | .77 |
| 25 | .62 |
| 30 | .52 |
| 35 | .44 |
| 40 | .39 |
| 45 | .34 |
| 50 | .30 |
| 60 | .25 |
| 70 | .22 |

Referring again to the FIG. 2 embodiment, the low point in the effluent pipe 13 is designed such that the depth of the hydraulic compression zone A—17 feet in this case—is greater than the liquid level in the clarifier 16, which provides compression of about half an atmosphere. This compression is adequate to effect dissolution of most or all of the microbubbles in the compression zone and in effluent pipe 13 during transfer of mixed liquor to the clarifier.

The beneficial effects of the elimination of microbubbles are:

(1) to minimize or eliminate the rising of pin point floc attached to the microbubbles. The rate of dissolution of microbubbles is also a function of the duration time that the mixed liquor is held under pressure. It has been observed that a duration time of 15 seconds is adequate;

(2) to minimize or eliminate microbubbles, which would otherwise serve as nuclei which promote degassing of liquor supersaturated with nitrogen; and (3) to increase the density of sludge in compaction of the sludge blanket in the clarifier.

It must be emphasized that the beneficial effects of compression, as hereinbefore indicated, are obtained only in the substantial absence of macrobubbles; the elimination or minimization of such macrobubbles being attained in accordance with the teachings of the present invention. Adverse effects produced by the combination of excessive nitrogen entrainment and hydraulic compression are:

(1) dissolution of excessive nitrogen which degasses in the clarifier and results in rising sludge; and (2) inability to dissolve microbubbles because dissolution of excess gas from macrobubbles causes the mixed liquor to become saturated with nitrogen thus preventing dissolution of microbubbles.

Figure 3:
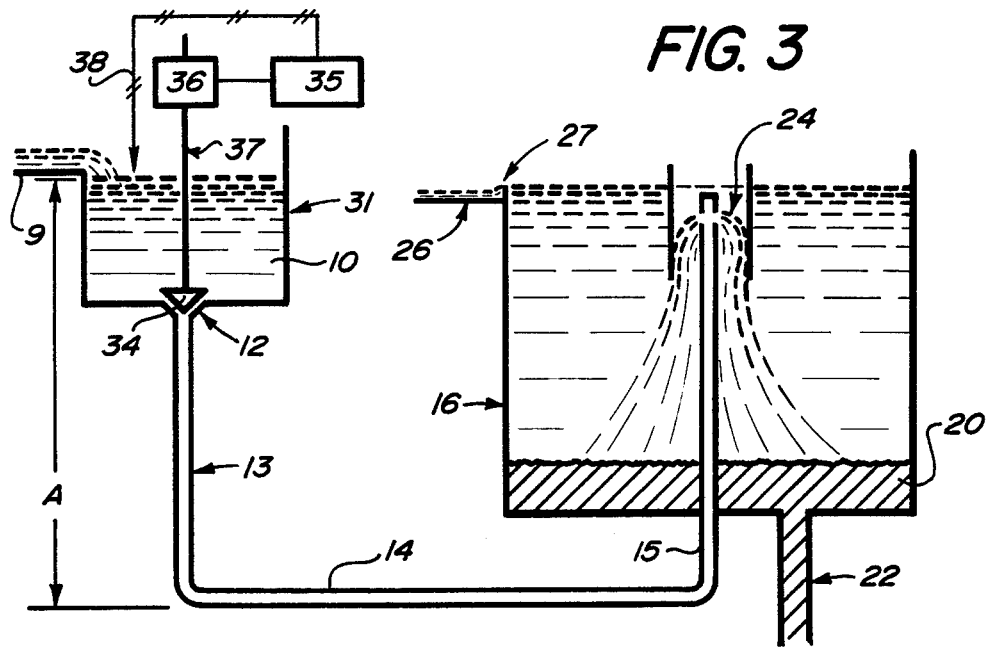
FIG. 3 is a simplified schematic flow diagram of an alternative embodiment for practice of the invention.

FIG. 3 illustrates an alternative embodiment for practice of the invention. In this embodiment, macrobubbles are removed in the effluent channel and turbulent transfer of mixed liquor to the effluent pit is minimized to the point that little or no air is mixed and entrained with the liquor. As seen in FIG. 3 and compared to the conventional design illustrated in FIG. 1, the height of liquid surface in effluent pit 31 is raised so that the vertical distance of the drop of mixed liquor from trough 9 into the effluent pit is considerably reduced, thus avoiding excessive turbulence and re-entrainment of air into the mixed liquor.

To minimize the extent of air entrainment, the vertical drop of liquor from channel 9 to the level of the liquor in pit 31 should be less than 18 inches and preferably less than about 6 inches. In conventional installations, such as that illustrated in FIG. 1, the uncontrolled drop is generally greater than about 24 inches.

In the embodiment illustrated in FIG. 3, the vertical distance of the drop from channel 9 into pit 31 is controlled by regulating the level of the liquid in the pit; the liquid level in the effluent channel does not vary by more than a few inches from a mean.

Control of the liquid level in the effluent pit 31 (FIG. 3) is had by means of a flow restrictor 34 at the entry mouth 12 of pipe 13. By raising and lowering flow restrictor 34, the rate of flow of liquir into pipe 13 is regulated and, in turn, the differential between the liquid level in effluent channel 9 and the surface level of the mixed liquor in pit 31 controlled.

The raising and lowering of flow restrictor 34 can be effected, as shown, by a drive motor 35 which is mechanically coupled to a gear box 36 arranged to raise and lower shaft 37 attached to flow restrictor 34. A level sensing device 38 determines the existing level of the surface of liquid in pit 31 and is operatively connected to means for actuating motor 35 and its direction of rotation. When the liquid level in pit 31 is too low, sensor 38 actuates motor 35 to rotate in a direction to lower shaft 37, thereby further restricting liquid discharge into pipe 13 and causing the level of liquid in pit 31 to rise. When the surface of the liquid in the pit is too high, the sensor 38 actuates motor 35 to rotate in a direction causing shaft 37 to rise, thereby opening the constriction between 34 and the mouth 12 of pipe 13 to permit a higher flow rate of liquid into the pipe, thereby lowering the level of liquid in pit 31.

In the embodiment shown in FIG. 3, macrobubbles formed from air entrained in the last stage of the aeration zone are allowed to escape from the mixed liquor in the effluent channel 9 prior to admission to the effluent pit 31. In this case, neither the depth of the descending liquor in the pit nor the rate of descent is critical. However, conditions in effluent channel 9 must be maintained such as to assure that macrobubbles are allowed sufficient time to rise and that additional macrobubbles are not introduced. This is achieved by maintaining a residence time in the effluent channel of at least about a minute, and further by limiting the vertical drop from the channel 9 to the effluent pit as explained above. Also, the use in the effluent channel or in the effluent pit of means to aeration, such as by air sparging, are to be avoided.

The embodiment depicted in FIG. 3 utilizes a compression zone to eliminate microbubbles under the same conditions as described with respect to the FIG. 2 embodiment. The several features of both embodiments may be combined in a single system in order to assure maximum removal of macrobubbles before the mixed liquor undergoes hydraulic compression.

A series of experiments were carried out in the laboratory to demonstrate the principles of the invention.

EXAMPLE 1

The beneficial effect of hydrostatic pressure imposed on the mixed liquor in the substantial absence of macrobubbles therein was demonstrated using an actual sample of mixed liquor from the effluent channel of an operating plant.

The sample was divided into identical cylinders, each 14 inches deep and the liquor was allowed to outgas for 60 seconds in order to allow macrobubbles, which were entrapped during the filling of the cylinders, to escape. The mixed liquor contained about 3,000 ppm solids and had an initial NOX concentration of 3.3 ppm by weight, expressed as nitrogen.

One cylinder was subjected to a static pressure of 7.5 psig by application of nitrogen pressure thereon without sparging and the other cylinder was left alone. Both samples exhibited reduction of the sludge blanket to about 40% of the original height after 15 minutes standing. Sludge in the unpressured sample started to rise after 20 minutes and had wholly risen to the surface in 47 minutes.

The pressured sample exhibited reduction of the sludge blanket to 28% of the original height after 47 minutes and was free of rising sludge. The same pressured sample exhibited further reduction of the sludge blanket to 25.5% of the original height and no sludge had risen after 16 hours.

The foregoing example demonstrates the beneficial effect of compression on avoiding rising sludge and on improving compaction of the sludge layer.

EXAMPLE 2

In another experiment on mixed liquor from the same plant as in Example 1, the samples were placed in identical cylinders of 14 inch depth. Each of the samples were sparged with gas at a rate sufficient to expand the liquor volume by more than one percent. One was sparged with nitrogen gas at 7.3 psig and the other with nitrogen gas at atmospheric pressure for ten minutes, after which the sparging in both cylinders was stopped and the pressure on the pressurized cylinder was reduced to atmospheric. The sludge in the cylinder which had been sparged under pressure settled to about 85% of its original height and began to rise after two minutes standing, completely rising to the surface in five minutes. The sludge which was sparged at atmospheric pressure settled to 60% of its original height on five minutes standing; after 15 minutes the sludge was at 40% of its original height and was free of rising sludge.

EXAMPLE 3

The two mixed liquor samples were placed in cylinders as in the previous Example 2. One sample was sparged with nitrogen gas at 3.1 psig and the other with nitrogen gas at atmospheric pressure for ten minutes, after which time sparging was discontinued and the pressurized cylinder reduced to atmospheric. The sludge in the cylinder which had been sparged under pressure settled to about 70% of its original height at ten minutes, after which time sludge began to rise; by thirty minutes 90% of the sludge had risen to the top. The sludge in the mixed liquor which had been sparged at atmospheric pressure settled to 23% of its original height in eleven minutes; in thirty minutes it was at 22% of original height and showed no signs of sludge rising.

Examples 2 and 3 demonstrate the detrimental effect of superatmospheric nitrogen pressure on mixed liquor containing a gas volume in excess of one percent. Under superatmospheric pressure the liquor was supersaturated with nitrogen, which outgassed at atmospheric pressure and the resulting bubbles of nitrogen served to float sludge to the top.

The invention is applicable to any activated sludge system in which the problem of sludge rising in the secondary clarifier is potentially present. The problem of sludge rising is particularly prevalent in systems in which the effluent from the aeration zone which is introduced into the clarifier, contains NOX, which is subsequently reduced to elemental nitrogen by the oxygen demand of the sludge at the bottom of the clarifier. The invention is equally applicable to such activated sludge systems employing atmospheric air as well as to systems employing oxygen-containing gas of higher oxygen concentration.

What is claimed is:

1. In the operation of an activated sludge system for treatment of wastewater wherein a mixed liquor comprising aerated wastewater and sludge-forming biomass is passed from an aeration zone to a clarifier for settling the sludge therein, the method of inhibiting rising of the settled sludge in the clarifier which comprises: maintaining the aerated mixed liquor during transfer from the aeration zone to the clarifier in an effluent basin, said basin being of such area and depth that the downward flow rate of the mixed liquor therein is exceeded by the upward rate of rise of contained macrobubbles; and subjecting the aerated mixed liquor to a hydraulic pressure effective to promote dissolution of contained microbubbles prior to introducing the mixed liquor into the clarifier.

2. The method as defined in claim 1 wherein said mixed liquor contains NOX.

3. The method as defined in claim 2 wherein said hydraulic pressure is that resulting from withdrawal of the mixed liquor from the bottom of said basin through a downwardly extending conduit leading from said basin and discharging into said clarifier.

4. The method as defined in claim 3 wherein the area of said effluent basin is such that the rate of descent of the mixed liquor therein is less than 0.4 feet per second and the liquid depth in said basin is greater than four feet above the inlet to the conduit through which the contained liquor is discharged from said basin.

5. The method as defined in claim 4 wherein the depth of liquid in said effluent basin is at least about 10 feet.

6. The method as defined in claim 1 wherein the concentration of bubbles is reduced to less than about 0.7 volume percent before subjecting the liquor to hydraulic compression, and wherein such subsequent hydraulic compression is under conditions corresponding to about 7.3 psig for at least 15 seconds.

7. The method as defined in claim 6 wherein the concentration of bubbles is reduced to less than about 0.3 volume percent before subjecting the liquor to hydraulic compression.

8. In an activated sludge system for treatment of wastewater wherein a mixed liquor comprising aerated wastewater and sludge-forming biomass is passed from an aeration zone to a clarifier via an open channel flowing to an effluent basin, the method of inhibiting rising of settled sludge in the clarifier which comprises: containing said wastewater in the open channel under conditions such as to assure that macrobubbles are allowed time to rise and the rate of rise of the macrobubbles exceeds the downward flow rate of mixed liquor in the effluent basin, maintaining conditions during discharge of the mixed liquor from said channel to the basin so as to avoid reentrainment of macrobubbles into the mixed liquor, and subsequently subjecting the mixed liquor to a hydraulic pressure effective to promote dissolution of contained microbubbles prior to introducing the mixed liquor into the clarifier.

9. The method as defined in claim 8 wherein the conditions under which mixed liquor is discharged from the channel to the basin include a controlled vertical drop of less than about 18 inches.

10. The method as defined in claim 9 wherein said vertical drop is less than about 6 inches.

11. The method as defined in claim 10 wherein the control of the height of the vertical drop is effected by adjusting the level of liquid in the effluent basin.

12. The method as defined in claim 11 wherein the adjustment of the level is effected by controlling the rate of discharge of liquid from the bottom of said basin through flow restricting means automatically responsive to level sensing means in said basin.

13. The method as defined in claim 8 wherein the effluent basin is of such area and depth that the downward flow rate of mixed liquor therein towards a discharge outlet is exceeded by the upward rate of rise of contained macrobubbles.

14. The method as defined in claim 13 wherein said mixed liquor contains nitrates and/or nitrites.

15. The method as defined in claim 14 wherein the residence time of the flowing mixed liquor in said channel is at least one minute.

16. The method as defined in claim 15 wherein the residence time of the mixed liquor in the effluent basin is at least one minute.

* * * * *